US00RE39595E

(19) United States
(12) Reissued Patent
Liu

(10) Patent Number: US RE39,595 E
(45) Date of Reissued Patent: May 1, 2007

(54) VACUUM CLEANER TANK ASSEMBLY

(75) Inventor: Li Liu, Tucson, AZ (US)

(73) Assignee: Shop Vac Corporation, Williamsport, PA (US)

(21) Appl. No.: 10/619,518

(22) Filed: Jul. 15, 2003

Related U.S. Patent Documents

Reissue of:
(64) Patent No.: 6,179,889
Issued: Jan. 30, 2001
Appl. No.: 09/348,893
Filed: Jul. 7, 1999

(51) Int. Cl.
*B01D 46/02* (2006.01)

(52) U.S. Cl. ..... 55/368; 55/374; 55/378; 55/DIG. 2; 55/DIG. 3; 15/352

(58) Field of Classification Search ..... 55/368, 55/374, 378, 491, DIG. 2, DIG. 3; 15/347, 15/352
See application file for complete search history.

(56) References Cited

U.S. PATENT DOCUMENTS

| | | | |
|---|---|---|---|
| 2,784,800 | A | 3/1957 | Segesman |
| 3,142,857 | A | 8/1964 | Fresard et al. |
| 3,209,523 | A | 10/1965 | Smithson |
| 3,350,857 | A | 11/1967 | Fesco |
| 3,375,541 | A | 4/1968 | Fromknecht |
| 3,597,903 | A | 8/1971 | Schaaf |
| 3,675,399 | A | 7/1972 | Westergren |
| 3,812,859 | A | 5/1974 | Westergren et al. |
| 3,830,043 | A | 8/1974 | Nielsen et al. |
| 3,870,491 | A | 3/1975 | Friesen et al. |
| 4,381,192 | A | 4/1983 | Grimard |
| 4,469,498 | A | 9/1984 | Fish |
| 4,591,369 | A | 5/1986 | Stewart, Sr. et al. |
| 4,699,641 | A | 10/1987 | Barnes, Jr. |
| 4,738,697 | A | 4/1988 | Westergren |
| 4,877,432 | A | 10/1989 | Lackner |
| 4,961,765 | A | 10/1990 | Gühne et al. |
| 5,057,131 | A | 10/1991 | Lackner et al. |
| 5,064,455 | A | 11/1991 | Lackner |
| 5,089,038 | A | 2/1992 | Kopco et al. |
| 5,092,915 | A | 3/1992 | Lackner |
| 5,464,460 | A | 11/1995 | Bosses |
| 5,544,385 | A | 8/1996 | Jailor et al. |
| 5,792,224 | A | 8/1998 | Fu et al. |

*Primary Examiner*—Christopher Upton
(74) *Attorney, Agent, or Firm*—Marshall, Gerstein & Borun LLP

(57) ABSTRACT

A vacuum cleaner filter bag retainer includes slots on each side which receive a cardboard plate attached to a filter bag. The plate is slid into the slots of the filter bag retainer such that openings in the plate and bag match with an opening in the filter bag retainer. The retainer is attached to a tank through an opening in the tank, and an inlet fitting extends from outside the tank, through the retainer, and into the bag. The inlet fitting, therefore, prevents the bag from sliding out of the slots in the retainer. A swivel fitting loosely traps the inlet fitting adjacent the filter bag retainer through threads on the swivel fitting and the retainer. The inlet fitting also holds a hose to the inlet fitting.

8 Claims, 5 Drawing Sheets

AMENDED FIG. 1

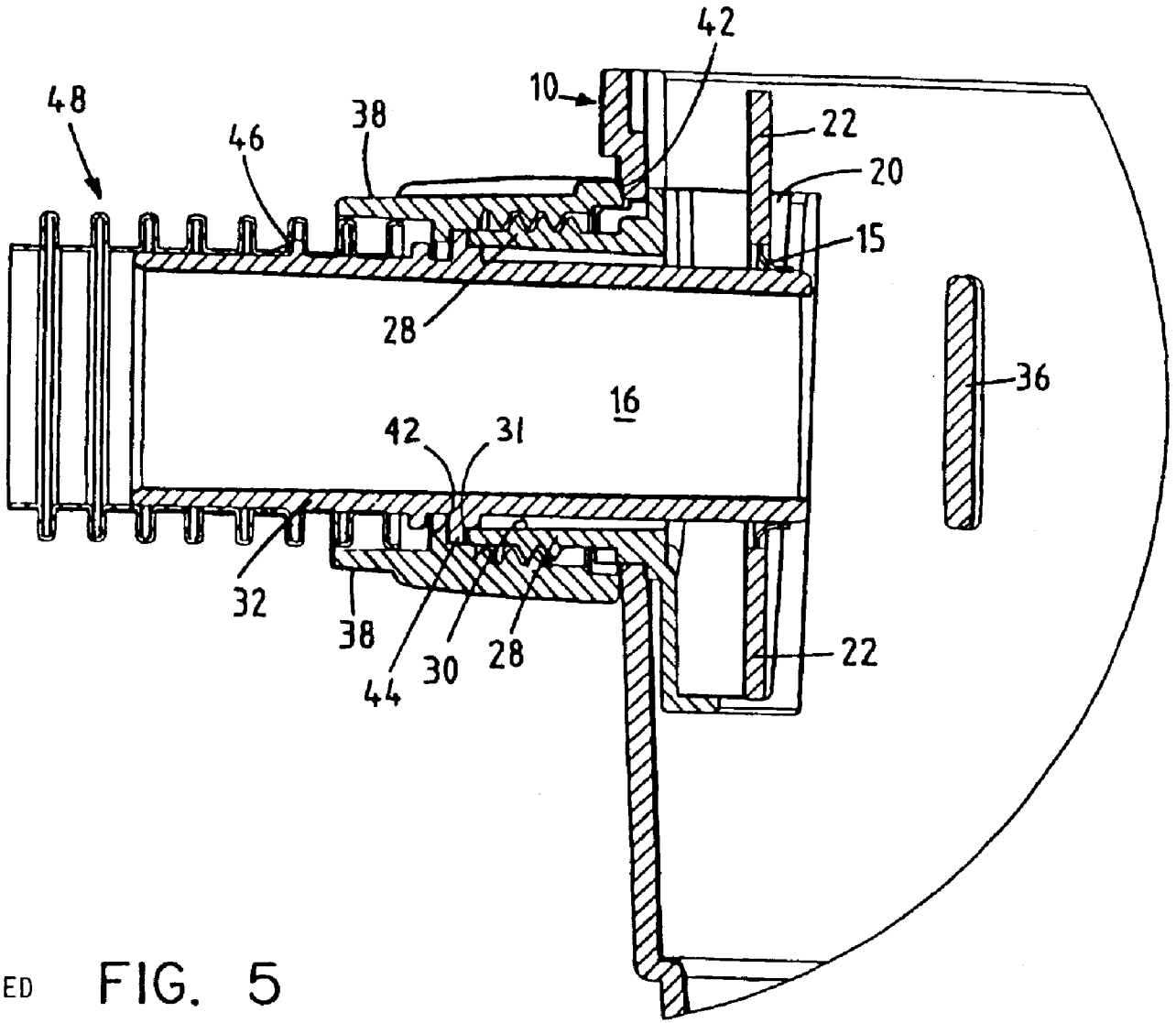
AMENDED FIG. 5

VACUUM CLEANER TANK ASSEMBLY

Matter enclosed in heavy brackets [ ] appears in the original patent but forms no part of this reissue specification; matter printed in italics indicates the additions made by reissue.

TECHNICAL FIELD OF THE INVENTION

The present invention relates in general to vacuum cleaners and in particular to a vacuum cleaner assembly for securely housing a filter bag inside a receptacle or tank.

BACKGROUND OF THE INVENTION

Vacuum cleaners often include a disposable filter bag. The filter bag collects particulate matter from air passing through the filter bag for subsequent disposal. Typically, the filter bag is removably mounted in a tank or other receptacle associated with the vacuum cleaner. When the filter bag is full, it is removed and an empty filter bag is installed in the tank.

Most filter bags include a cardboard plate with an aperture aligned to an opening in the filter bag. To install an empty filter bag in the vacuum cleaner tank, in such a way as to prevent unwanted movement of the filter bag, the aperture in the cardboard plate is pushed on to a filter bag mount. The filter bag mount is connected to the vacuum cleaner tank and to a hose. The combination usually remains in place due to friction or an interference fit. An aperture in the filter bag mount allows dirty air to pass from the hose to the filter bag where the dirt is collected. In order to reduce the amount of dirty air that escapes (i.e., air which fails to pass through the filter bag), and to help maintain the position of the filter bag, the filter bag mount may include a raised flange or other seal.

Prior art systems allow an individual to replace the filter bag in such a way as to reduce movement and dirty air escape, however, these prior art systems suffer from certain drawbacks. The filter bag mount with raised flange requires the user to force and/or bend the cardboard plate into position. As a result, user's often find it difficult to install a new filter bag. Further, damage may occur to the cardboard plate, thereby increasing the amount of dirty air that escapes or possibly resulting in the cardboard plate and bag becoming entirely dislodged.

SUMMARY OF THE INVENTION

In accordance with a first aspect of the invention, a vacuum cleaner assembly for attaching a filter bag to a receptacle, the filter bag including a plate, and the receptacle including an inlet, is provided. The assembly includes a filter bag retainer. The assembly also includes a first fitting extending from outside the receptacle through the tank inlet, through the filter bag retainer, and into the filter bag. A second fitting engages the filter bag retainer to trap the first fitting adjacent to the filter bag retainer.

In some embodiments, the filter bag retainer includes first and second slots for receiving the plate on the filter bag. Further, the filter bag retainer may include a threaded cylinder forming a retainer aperture, wherein the threaded cylinder is inserted through the inlet. Still further, the filter bag retainer may include a first threaded aperture, and the second fitting may include a second threaded aperture, wherein the first threaded aperture is adapted to pass through the inlet and couple to the second threaded aperture. In some embodiments, the second fitting is further adapted to bold a hose adjacent to the inlet fitting.

In a preferred embodiment, the first fitting includes a first ridged member [and a second ridged member]. Further, the filter bag retainer comprises a threaded cylinder and a first abutment. Still further, the second fitting includes a threaded inner surface and a second abutment. Accordingly, the assembly is adapted to trap the first ridged member [against] *between* the first abutment and [to trap the second ridged member against] the second abutment as the threaded inner surface is tightened on to the threaded cylinder.

In any of the foregoing, the vacuum cleaner assembly may further comprise a hose, wherein the hose comprises a grooved aperture. In such an instance, the second fitting includes a ridge and the grooved aperture couples to the ridge. In the preferred embodiment, the receptacle comprises a tank.

In accordance with another aspect of the invention, a vacuum cleaner is provided. The vacuum cleaner includes a receptacle with an inlet. Further, vacuum cleaner includes a filter bag with a filter bag aperture. Still further, the vacuum cleaner includes a plate connected to the filter bag, wherein the plate also has an aperture. Yet further, the vacuum cleaner includes a filter bag retainer with first and second retainer slots, a threaded cylinder, and a cylinder abutment, wherein the plate slides into the retainer slots and the threaded cylinder is inserted into the tank aperture. In addition, the vacuum cleaner includes a first fitting with a ridged end, a non-ridged end, *and* a [first] ridged member, [and a second ridged member,] wherein the non-ridged end is inserted through the inlet, the filter bag aperture, and the plate aperture. Also, the vacuum cleaner includes a second fitting with a threaded inner surface and a fitting abutment, wherein the threaded inner surface engages the threaded cylinder thereby [forcing] *trapping* the [first] ridged member [against] *between* the cylinder abutment and [forcing the second ridged member against] the fitting abutment.

In some embodiments, the vacuum cleaner further comprises a hose with outer ribs and inner ribs, wherein the outer ribs engage the threaded inner surface of the second fitting and the inner ribs engage the [threaded] *ridged* end of the first fitting.

BRIEF DESCRIPTION OF THE DRAWINGS

These and other features and advantages of the present invention will become more apparent from a detailed consideration of the following detailed description of certain preferred embodiments when taken in conjunction with the drawings in which:

FIG. 5 is an enlarged view of detail A in FIG. 3.

DETAILED DESCRIPTION OF THE PREFERRED EMBODIMENTS

Vacuum cleaners typically comprise a motor assembly, a tank or other receptacle, a lid, a motor assembly, a hose inlet on the receptacle, and a hose that attaches to the hose inlet at one end and has a nozzle at the other end. The lid has a rim which is designed to fit over the edge of the receptacle of the vacuum cleaner. Around the periphery of the lid are several latch ports which cooperate with latches on the receptacle in order to hold the lid on the receptacle. The lid houses a motor assembly that is in air flow communication with the receptacle through a filter. Generally, the motor assembly includes an electric motor, a power cord for use with an electrical outlet, an air impeller, various housings, and other associated equipment. The motor of the motor assembly drives an impeller that creates a low pressure area inside the receptacle. The pressure difference between the inside and the outside of the receptacle creates a suction effect at the hose inlet, which causes dust, debris, and liquids to enter the receptacle through the hose.

Figure 1:
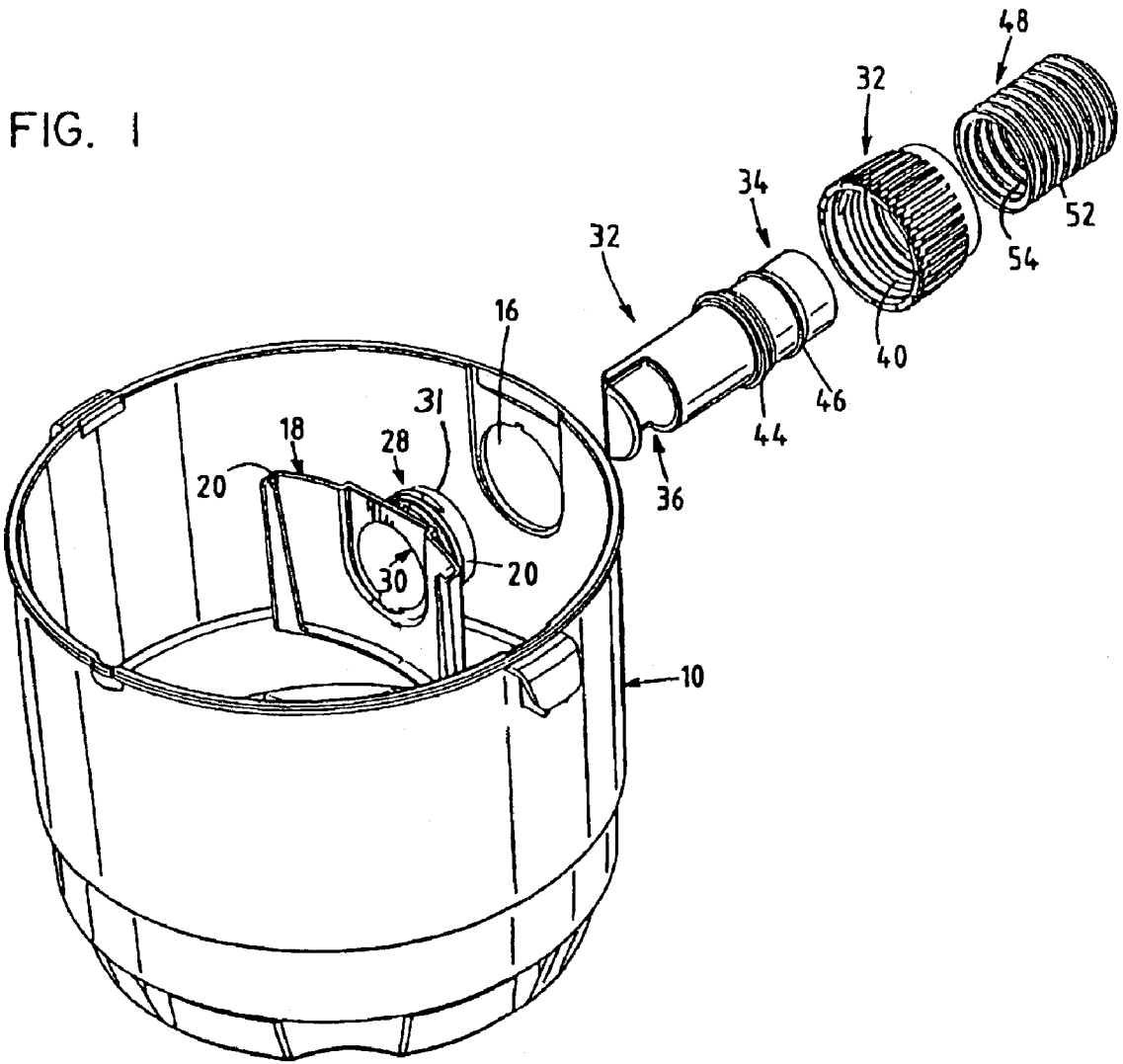
FIG. 1 is an exploded view of a vacuum cleaner tank assembly, constructed in accordance with teachings of the present invention.
Figure 2:
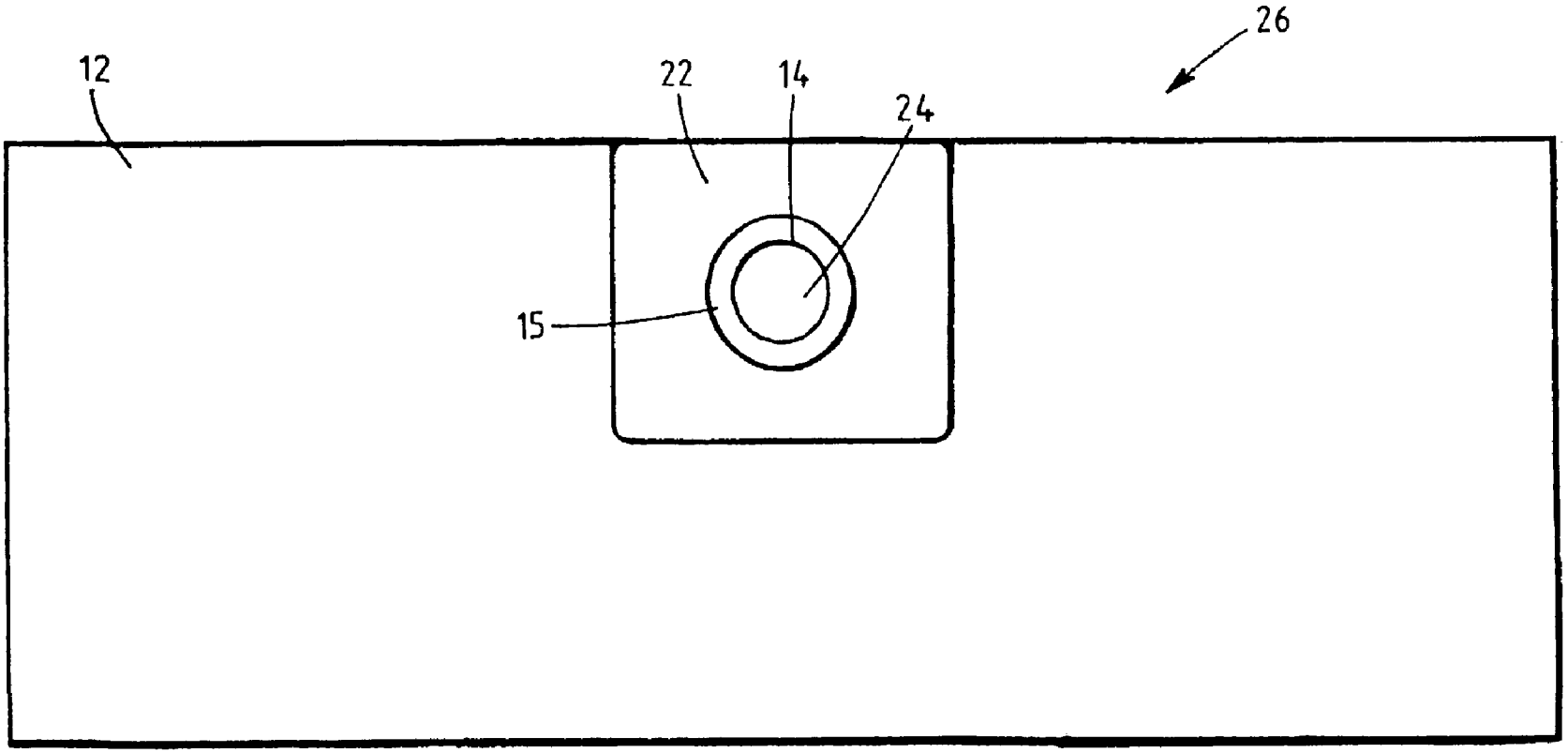
FIG. 2 is front view of a filter bag assembly.

Referring to FIG. 1 and FIG. 2, a vacuum cleaner tank or receptacle 10 (FIG. 1) is used to house a filter bag 12 (FIG. 2). The filter bag 12 includes an aperture 14 surrounded by a gasket 15 through which air containing particulate matter may pass for filtering. The tank 10 includes an inlet 16 through which the air may pass to the filter bag aperture 14. The filter bag 12 may be made of a variety of materials including, but not limited to, paper, foam, cloth or other woven materials. The filter bag 12 is securely held in place inside the filter tank 10, in part, by a filter bag retainer 18. The filter bag retainer 18 may be formed from plastic materials, such as polypropylene, polyethylene, ABS, and/or similar materials. Preferably, the filter bag retainer 18 includes two slots 20. The slots 20 are used to receive a plate 22 on the filter bag 12. Preferably, the plate 22 is made of cardboard and contains an aperture 24 substantially the same size as the inlet 16. The plate 22 is permanently attached to the filter bag 12 in a known manner such that the plate aperture 24 substantially aligns with the filter bag aperture 14, thereby creating a filter bag assembly 26.

The filter bag retainer 18 includes a threaded cylinder 28 forming a retainer aperture 30. Further, the threaded cylinder 28 includes a cylinder abutment 31. Preferably, the retainer aperture 30 is substantially the same size as the filter bag aperture 14, the plate aperture 24, and the inlet 16. In the preferred embodiment, the filter bag assembly 26 is attached to the filter bag retainer 18 by sliding the plate 22 into the retainer slots 20. The filter bag assembly 26 is then held in position inside the tank 10 by inserting the threaded cylinder 28 through the inlet 16 from the inside of the tank 10 to the outside of the tank 10. As a result, the inlet 16, the retainer aperture 30, the plate aperture 24, and the filter bag aperture 14 are coaxially aligned.

For the purpose of restricting both horizontal and vertical movement of the aligned apertures (14, 16, 24, 30), an inlet fitting 32 is provided. The inlet fitting 32 is cylindrical in shape with a ridged end 34 and a non-ridged end 36. By inserting the non-ridged end 36 of the inlet fitting 32 through the aligned apertures (14, 16, 24, 30) in a direction from outside the tank 10 to inside the tank 10, the filter bag assembly 26 is prevented from sliding out of the retainer slots 20. Accordingly, the filter bag 12 is secured to the retainer 18 by the inlet fitting 32 inside the tank 10, and the particulated air may pass easily through all of the apertures (14, 16, 24, 30).

Figure 3:
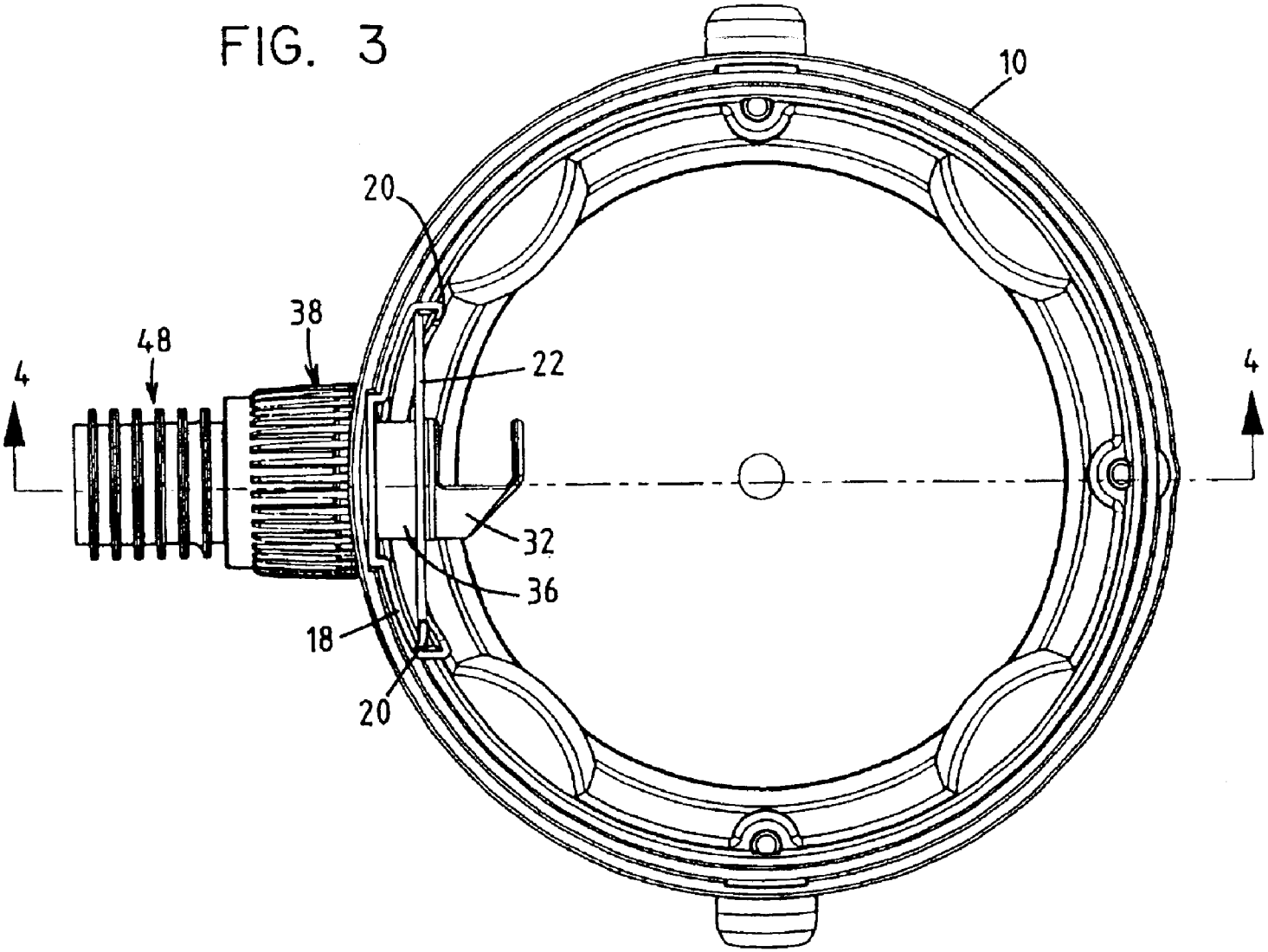
FIG. 3 is a top plan view of the vacuum cleaner tank assembly of FIG. 1.
Figure 4:
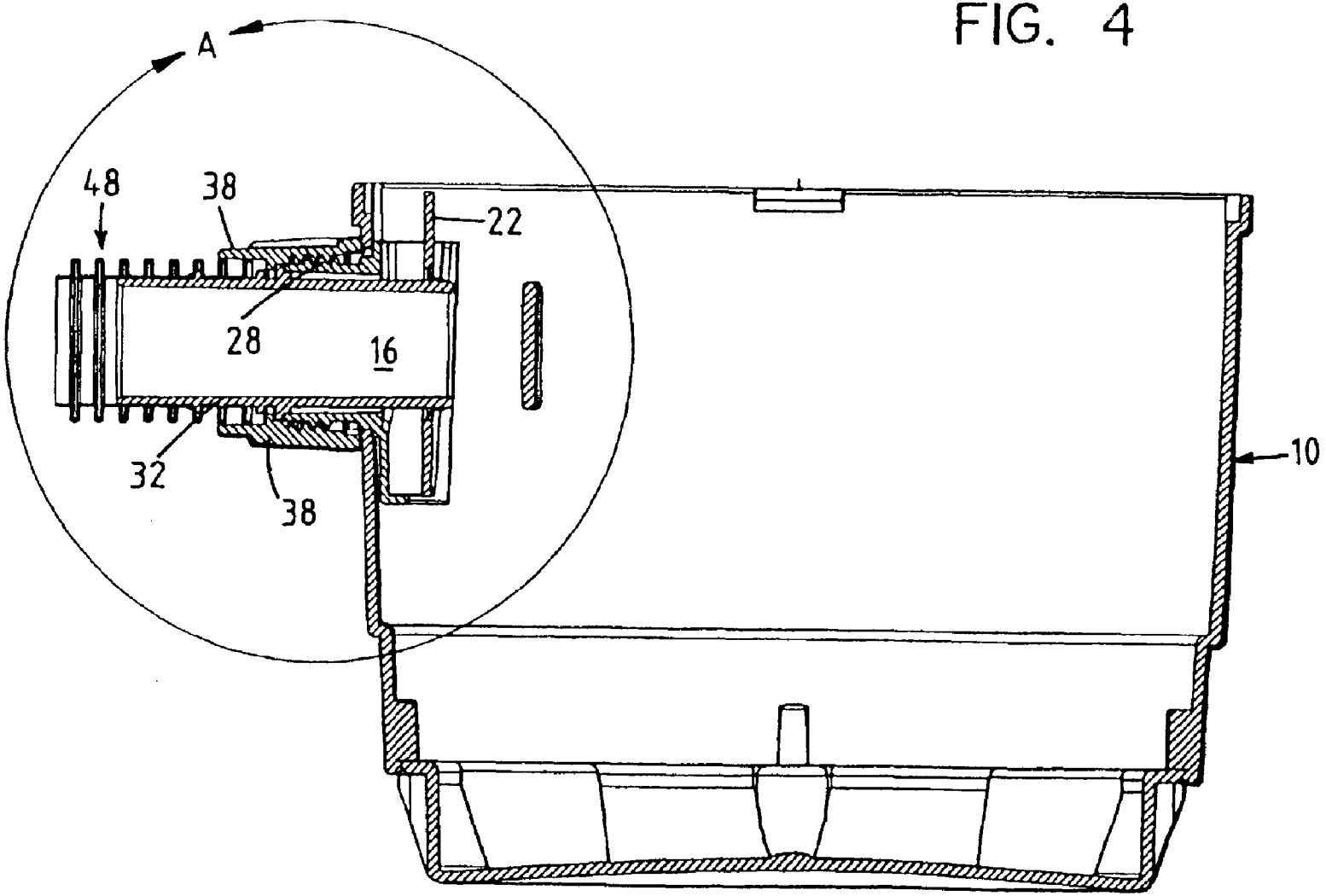
FIG. 4 is a cross sectional view taken generally along line 3—3 in FIG. 2.

For the purpose of loosely trapping the inlet fitting 32 adjacent the filter bag retainer 18, a swivel fitting 38 is provided. The swivel fitting 38 is cylindrical in shape and includes a threaded inner surface 40 and a swivel fitting abutment 42. The threaded inner surface 40 of the swivel fitting 38 engages and joins the threaded cylinder 28 of the filter bag retainer 18 by rotation of the swivel fitting 38. As the swivel fitting 38 is tightened down on the filter bag retainer 18, a first ridged member 44 of the inlet fitting 32 is loosely trapped [adjacent] *between* the cylinder abutment 31, and [a second ridged member 46 of the inlet fitting 32 is loosely trapped adjacent] the swivel fitting abutment 42 (see FIGS. 3–5).

In addition, a hose 48 is provided. The hose 48 includes a series of outer ribs 52 and a series of inner ribs 54 forming a grooved aperture. The inner ribs 54 engage and couple to [the] *a* second ridged member 46 of the inlet fitting 32 preferably using a force fit in a known manner. In this configuration, the end of the hose 48 may travel with the rotating swivel fitting 38 (see FIGS. 3–5).

In summary, persons of ordinary skill in the art will readily appreciate that a vacuum cleaner tank assembly for securely housing a filter bag inside a vacuum cleaner tank has been provided. Systems implementing the teachings of the invention do not require the user to force and/or bend the cardboard plate into position. As a result, user's will find it easier to install a new filter bag. Further, less damage will occur to the cardboard plate, thereby decreasing the amount of dirty air that escapes.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A vacuum cleaner assembly for attaching a filter bag to a receptacle, the receptacle including an inlet, the assembly comprising:

a filter bag retainer;

a first fitting extending from outside the receptacle through the inlet, through the filter bag retainer, and into the filter bag; and, a second fitting engaging the filter bag retainer to trap the first fitting adjacent to the filter bag retainer.

2. The vacuum cleaner assembly defined in claim 1, wherein the filter bag retainer comprises first and second slots for receiving a plate on the filter bag.

3. The vacuum cleaner assembly defined in claim 1, wherein the filter bag retainer further comprises a threaded cylinder forming a retainer aperture, wherein the threaded cylinder is inserted through the inlet.

4. The vacuum cleaner assembly defined in claim 1, wherein the filter bag retainer comprises a first threaded aperture, and the second fitting comprises a second threaded aperture, the first threaded aperture is adapted to pass through the inlet and couple to the second threaded aperture.

5. The vacuum cleaner assembly defined in claim 1, wherein the second fitting is further adapted to hold a hose adjacent to the inlet fitting.

[6. The vacuum cleaner assembly defined in claim 1, wherein the first fitting comprises a first ridged member and a second ridged member;

the filter bag retainer comprises a threaded cylinder and a first abutment;

the second fitting comprises a threaded inner surface and a second abutment; and the assembly is adapted to loosely trap the first ridged member against the first abutment and to loosely trap the second ridged member against the second abutment as the threaded inner surface is tightened on to the threaded cylinder.]

7. The vacuum cleaner assembly defined in claim 1, further comprising a hose, wherein the hose comprises a grooved aperture, the first fitting comprises a ridged member, and the grooved aperture couples to the ridged member.

8. The vacuum cleaner assembly defined in claim 1, wherein the receptacle comprises a tank.

[9. A vacuum cleaner assembly comprising:

a receptacle including an inlet;

a filter bag including a filter bag aperture;

a plate connected to the filter bag, wherein the plate includes a plate aperture;

a filter bag retainer including first and second retainer slots, a threaded cylinder, and a cylinder abutment, wherein the plate slides into the retainer slots and the threaded cylinder is inserted into the tank aperture;

a first fitting including a ridged end, a non-ridged end, a first ridged member, and a second ridged member, wherein the non-ridged end is inserted through the inlet, the filter bag aperture, and the plate aperture; and a second fitting including a threaded inner surface and a fitting abutment, wherein the threaded inner surface engages the threaded cylinder thereby trapping the first ridged member adjacent the cylinder abutment and trapping the second ridged member adjacent the fitting abutment.]

[10. The vacuum cleaner defined in claim 9, further comprising a hose including outer ribs and inner ribs, wherein the inner ribs engage the ridged end of the first fitting.]

*11. The vacuum cleaner assembly defined in claim 1, wherein the first fitting, comprises a first ridged member, the filter bag retainer comprises a threaded cylinder and a first abutment, the second fitting comprises a threaded inner surface and a second abutment, and the assembly is adapted to loosely trap the first ridged member between the first abutment and the second abutment as the threaded inner surface is tightened on to the threaded cylinder.*

* * * * *

UNITED STATES PATENT AND TRADEMARK OFFICE

CERTIFICATE OF CORRECTION

PATENT NO. : RE 39,595 E
APPLICATION NO. : 10/619518
DATED : May 1, 2007
INVENTOR(S) : Li H. Liu

It is certified that error appears in the above-identified patent and that said Letters Patent is hereby corrected as shown below:

In the Claims:

At Column 6, line 10, "fitting," should be -- fitting --.

Signed and Sealed this

Sixth Day of November, 2007

JON W. DUDAS
*Director of the United States Patent and Trademark Office*